Feb. 6, 1934.   A. N. GOLDSMITH   1,946,206
SOUND MOTION PICTURE
Filed June 27, 1930
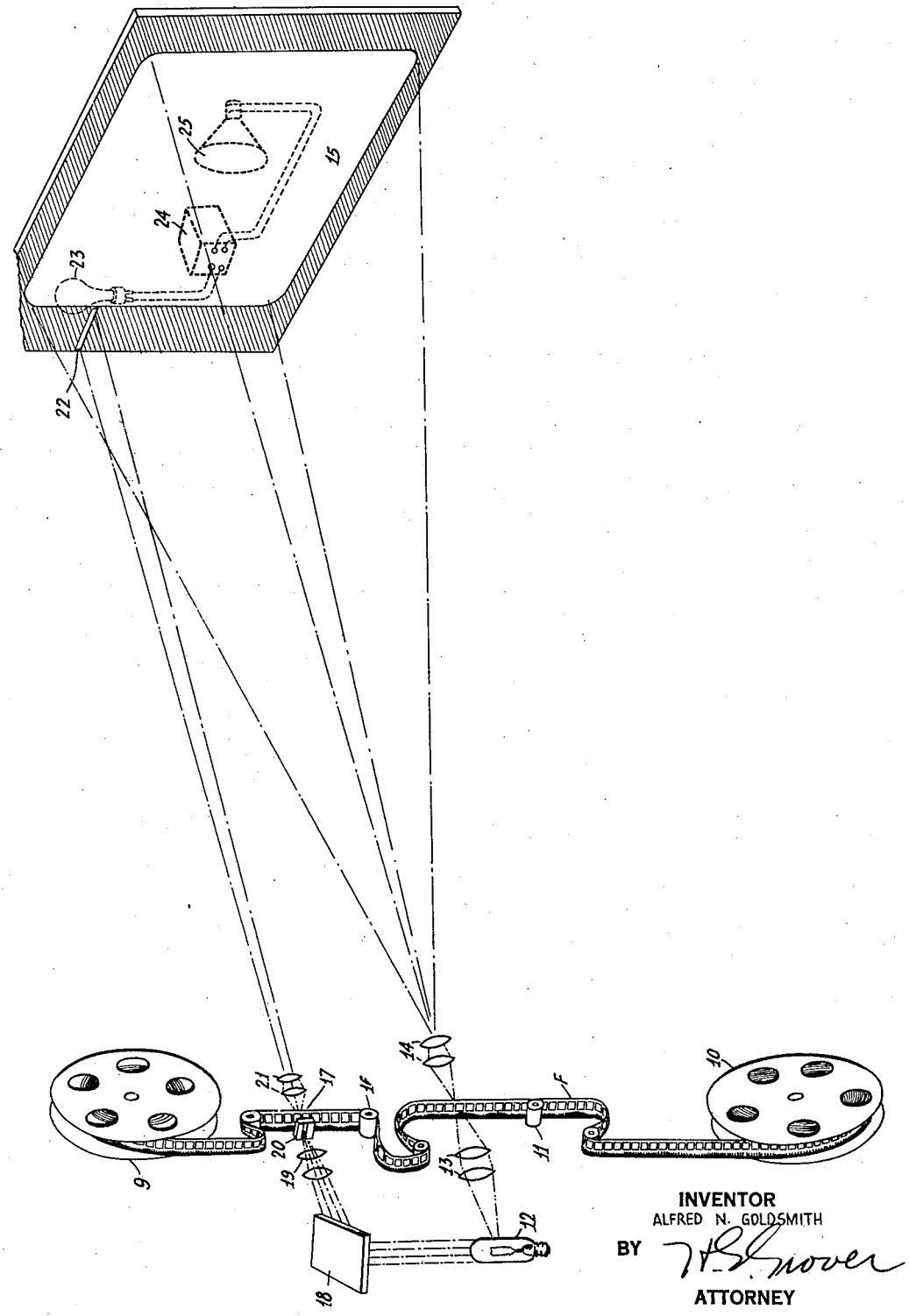
INVENTOR
ALFRED N. GOLDSMITH
BY
ATTORNEY Patented Feb. 6, 1934

1,946,206

UNITED STATES PATENT OFFICE 1,946,206

SOUND MOTION PICTURE

Alfred N. Goldsmith, New York, N. Y., assignor to Radio Corporation of America, a corporation of Delaware Application June 27, 1930. Serial No. 464,216

11 Claims. (Cl. 88—16.2)

This invention relates to an improved system and method for the projection of combined talking motion pictures.

It relates more particularly to a system in which it is unnecessary to have electrical connections between the sound amplifying and reproducing system located behind the screen and the projector which is located somewhat distant therefrom and in front thereof.

In the ordinary talking motion picture arrangement, in order to cause the sound produced to apparently emanate from the direction of the images viewed on the motion picture screen, it is necessary that the sound reproducer be located back of the screen, or at least in the general direction of the screen rather than in the vicinity of the projector. This naturally requires a wiring arrangement between the sound reproducing apparatus on the talking motion picture machine and the loud speaking apparatus arranged near the screen. In portable installations this is a considerable drawback as it necessitates arranging for connections being made between the screen and the projector sometimes involving a considerable distance.

The object of this invention is to overcome this objection with particular reference to a portable installation.

A further object of this invention is to produce a system of talking motion pictures which shall be simplified and shall not require the making of connections prior to having an exhibition.

A further object of this invention is to provide a talking motion picture equipment in two self-contained units requiring no electrical connections therebetween.

These and further objects of my application will become apparent from the following specification taken in connection with the appended claims.

My proposed system involves projecting the image of the sound portion of the talking motion picture film to the vicinity of the motion picture screen, and there causing it to act upon a photoelectric cell arranged to actuate the sound reproducing device. In accomplishing this, it is necessary that the image of the sound strip be projected from a point at which it is continuously moved in the same manner in which it is done when the sound reproduction takes place entirely in the sound motion picture machine. A portion of the light used to project the picture portion of the film may be utilized by means of a prism or lens to supply the light to project the image of the sound portion of the film, thereby obviating the necessity for an additional high powered lamp.

The portion of the viewing screen upon which the image of the moving sound track image is projected is blackened or rendered otherwise non-deflecting, and a narrow slit is cut through the screen at right angles to the direction of motion of the sound track. The photo cell is arranged behind the slit and connected to the amplifying device in the usual manner.

Having thus briefly described my invention, attention is invited to the accompanying drawing in which; F represents the combined talking motion picture film which is supplied by the reel 9 and passed through the machine (schematically illustrated) to the pick-up reel 10. The film is moved intermittently through the picture projector portion of the film by means of the intermittent sprocket 11. The light for projecting the film is supplied by means of the light source 12 and condensed upon the film by means of the condenser lenses 13. The projector lenses 14 serve to focus the illuminated portion of the film upon the viewing screen 15 in the usual manner. The film F is moved continuously through the sound reproducing portion of the projector by means of the continuously moving sprocket 16. Thus the film F is moved continuously at the point 17. A mirror 18 is arranged to deflect the portion of the light from the light source 12 through the condenser lenses 19 and the aperture plate 20 upon the film at the point 17. The image of the portion of the film thus illuminated is focussed by means of the projection lenses 21 upon the margin of the viewing screen 15. A sound slit 22 is arranged to admit a portion of the light thus focussed upon it to the rear of the screen where it falls upon the photo cell 23. The photo cell 23 is connected to the amplifier 24, which serves to amplify the impulses created by the fluctuating light passing through the slit 22 and supply the amplified energy to the reproducing loud speaker device 25 in the usual manner.

The light source may be of any well known type as, for instance, an incandescent lamp, and the projection and condenser lenses may be of the usual and well known type, per se, constituting no part of the present invention. The mirror 18 may be replaced by a prism or any other arrangement for deflecting a portion of the light of the projector lamp 12. The optical arrangement for the sound reproduction may be of the usual and well known type and any means may be used for focussing the light upon only a small linear portion of the sound track, none of these details constituting in themselves a feature of the present invention. However, it is to be understood that the slit 22 may be so arranged as to pass only a small portion of the actual image of the sound track therethrough to serve as an additional limiting arrangement with respect to the actual linear length of the sound strip, causing the sound reproduction at any given instant. Thus the slit 22 will assist the aperture member 20 in obtaining clear reproduction.

Having thus described my invention, attention is invited to the fact that I am not to be limited by the specific embodiment shown and described for the purpose of illustration only, but by the scope of my invention as set forth in the accompanying claims.

I claim:

1. In a talking motion picture arrangement, a viewing screen, a talking motion picture projector at a distance from said viewing screen, said projector including means for projecting a continuously moving image of the sound portion of the talking motion picture film upon said screen, said screen including a slit adapted to pass therethrough the continuously moving image of the sound portion of the film, and sound reproducing means adapted to be actuated by the image passed through said slit and thus reproduce the sound recorded on the sound portion of said sound motion picture film.

2. In a talking motion picture arrangement, a viewing screen, a talking motion picture projector at a distance from said viewing screen, said projector including means for projecting a continuously moving image of the sound portion of the talking motion picture film upon said screen, said screen including a slit adapted to pass therethrough the continuously moving image of the sound portion of the film, a light sensitive device adapted to be actuated by the light passed through said slit, and sound reproducing means adapted to be actuated by said light sensitive device and thus reproduce the sound recorded on the sound portion of said sound motion picture film.

3. In a talking motion picture arrangement, a viewing screen, a slit disposed in the vicinity of said screen, a talking motion picture projector at a distance from said viewing screen, said projector including means for projecting a continuously moving image of the sound portion of the talking motion picture film upon said slit, said slit being adapted to pass therethrough the continuously moving image of the sound portion of the film, a light sensitive device adapted to be actuated by the light passed through said slit, and sound reproducing means adapted to be actuated by said light sensitive device and thus reproduce the sound recorded upon the sound portion of said sound motion picture film.

4. In a talking motion picture arrangement, a viewing screen, a talking motion picture projector at a distance from said viewing screen, said projector including means for projecting a continuously moving image of the sound portion of the talking motion picture film upon said screen, said screen including a slit adapted to pass therethrough a portion of the continuously moving image of the sound portion of the film, a light sensitive device adapted to be actuated by the light passed through said slit, and sound reproducing means adapted to be actuated by said light sensitive device and thus reproduce the sound recorded on the sound portion of said sound motion picture film.

5. In a talking motion picture arrangement a viewing screen, a slit arranged in the vicinity of said motion picture screen, a talking motion picture projector at a distance from said viewing screen, said projector including means for projecting a continuously moving image of the sound portion of the talking motion picture film upon said slit, said slit being adapted to pass therethrough a portion of the continuously moving image of the sound portion of the film, a light sensitive device arranged to be actuated by the light passing through said slit, and sound reproducing means adapted to be actuated by said light sensitive device and thus reproduce the sound recorded on the sound portion of said motion picture film.

6. In a talking motion picture arrangement, a viewing screen, a talking motion picture projector at a distance from said viewing screen, said projector including means for projecting the image of the picture portion of the film upon said viewing screen and means for projecting a continuously moving image of the sound portion of the talking motion picture film upon said screen, said screen including a slit adapted to pass therethrough a portion of the continuously moving image of the sound portion of the film, a light sensitive device adapted to be actuated by the light passed through said slit, amplifying means for amplifying the current controlled by said light sensitive device and sound reproducing means adapted to be actuated by said amplifier device and thus reproduce the sound recorded on the sound portion of said sound motion picture film.

7. In a talking motion picture arrangement, a viewing screen, a slit disposed in the vicinity of said viewing screen, a talking motion picture projector at a distance from said viewing screen, said projector including means for projecting the image of the picture portion of said film upon said viewing screen, and means for projecting a continuously moving image of said sound portion of said talking motion picture film upon said slit, said slit being adapted to pass therethrough a portion of the continuously moving image of the sound portion of the film, a light sensitive device adapted to be actuated by the light passing through said slit, amplifying means for amplifying the current controlled by said light sensitive device, and sound reproducing means adapted to be actuated by said amplifier device and thus reproducing the sound recorded on the sound portion of said sound motion picture film.

8. In a talking motion picture arrangement, a viewing screen, a talking motion picture projector at a distance from said viewing screen, said projector including means for projecting the image of the picture portion of the film upon said viewing screen and means for projecting a continuously moving image of the sound portion of the talking motion picture film upon said screen, and a common light source for both of said projecting means, said screen including a slit adapted to pass therethrough a portion of the continuously moving image of the sound portion of the film, a light sensitive device adapted to be actuated by the light passed through said slit, amplifying means for amplifying the current controlled by said light sensitive device and sound reproducing means adapted to be actuated by said amplifier device and thus reproduce the sound recorded on the sound portion of said sound motion picture film.

9. In a talking motion picture arrangement, a viewing screen, a slit disposed in the vicinity of said screen, a talking motion picture projector at a distance from said viewing screen, said projector including means for projecting the image of the picture portion of the film upon said viewing screen, means for projecting the continuously moving image of the sound portion of the talking motion picture film upon said screen, and a common light source for both of said projecting means, said slit being adapted to pass therethrough a portion of the moving image of the sound portion of the film, a light sensitive device adapted to be actuated by the light passing through said slit, amplifying means for amplifying the current controlled by said light sensitive device, and a sound reproducing device adapted to be actuated by said amplifier device, and thus reproducing the sound recorded on said sound portion of said sound motion picture film.

10. Talking motion picture apparatus comprising a viewing screen, a marginal screen adjacent said viewing screen and having a slit therein, photoelectric means adjacent said slit and sound reproducing means connected to said photoelectric means for operation thereby; and projecting means remote from said screen for projecting moving pictures upon said viewing screen and sound records upon said marginal screen and slit.

11. Talking motion picture apparatus comprising a single viewing screen, a marginal screen adjacent said viewing screen and having a slit therein, photoelectric means adjacent said slit and sound reproducing means connected to said photoelectric means for operation thereby; and projecting means remote from said screen for projecting moving pictures upon said viewing screen and sound records upon said projection screen and slit.

ALFRED N. GOLDSMITH.